United States Patent [19]
Boehm et al.

[11] Patent Number: 5,683,312
[45] Date of Patent: Nov. 4, 1997

[54] FLUID OR LIQUID FILLED NON-WOUND GOLF BALL

[75] Inventors: Herbert C. Boehm, Norwell, Mass.; William E. Morgan, Barrington, R.I.; Walter L. Reid, Mattapoisett, Mass.; Samuel A. Pasqua, Jr., Bristol, R.I.; Christopher Cavallaro, Attleboro; Kevin M. Harris, New Bedford, both of Mass.

[73] Assignee: Acushnet Company, Fairhaven, Mass.

[21] Appl. No.: 615,346

[22] Filed: Mar. 11, 1996

[51] Int. Cl.$^6$ .................................................. A63B 37/08
[52] U.S. Cl. ............................ 473/354; 473/376; 473/378
[58] Field of Search ............................ 473/354, 377, 473/376, 378

[56] References Cited

U.S. PATENT DOCUMENTS

| | | | |
|---|---|---|---|
| 878,070 | 2/1908 | Kingzett | 473/354 |
| 1,298,410 | 3/1919 | Schupphaus | 473/354 |
| 1,530,820 | 3/1925 | Evans et al. | 473/354 X |
| 1,568,513 | 1/1926 | Lewis . | |
| 1,568,514 | 1/1926 | Lewis | 473/354 X |
| 1,622,601 | 3/1927 | Miller . | |
| 1,904,012 | 4/1933 | Reichard . | |
| 4,431,193 | 2/1984 | Nesbitt | 273/235 |
| 4,564,199 | 1/1986 | Adams | 473/354 X |
| 4,919,434 | 4/1990 | Saito | 273/235 |
| 5,150,906 | 9/1992 | Molitor et al. | 273/220 |
| 5,314,187 | 5/1994 | Proudfit | 273/235 |
| 5,439,227 | 8/1995 | Egashira et al. | 473/377 X |
| 5,467,994 | 11/1995 | Moriyama et al. | 273/222 |
| 5,480,155 | 1/1996 | Molitor et al. | 273/220 |

*Primary Examiner*—George J. Marlo
*Attorney, Agent, or Firm*—Pennie & Edmonds LLP

[57] ABSTRACT

A golf ball having a diameter of approximately 1.68 to 1.90 inches and comprising:

a fluid mass at the center of the ball;

a first, solid, non-wound mantle layer surrounding the fluid mass comprised of a polymer material selected from the group of thermoset rubber material, thermoplastic elastomeric material and plastic and having an inner diameter in the range of 30 to 70% of the ball diameter;

a second, solid, non-wound mantle layer surrounding and abutting the first mantle layer and being a polymer material selected from the group of thermoset rubber material and thermoplastic elastomeric material and having an outer diameter in the range of 80 to 98% of the ball diameter, a hardness of approximately 30 to 95 Shore C and a resiliency greater than 40 bashore; and a cover surrounding the second mantle layer.

20 Claims, 4 Drawing Sheets

FLUID OR LIQUID FILLED NON-WOUND GOLF BALL

FIELD OF THE INVENTION

The present invention is directed to a golf ball and, more particularly, a golf ball comprised of a fluid or liquid center, a first mantle layer surrounding the center, a second, solid, non-wound mantle layer and a cover.

BACKGROUND OF THE INVENTION

Generally, golf balls have been classified as two piece balls or three piece balls. Two piece balls are comprised of a solid polymeric core and a cover. These balls are generally easy to manufacture, but are regarded as having limited playing characteristics. Three piece balls are comprised of a solid or liquid filled center surrounded by tensioned elastomeric material and a cover. Three piece balls generally have a good "click" and "feel" when struck by a golf club, but are more difficult to manufacture than two piece balls.

The prior art is comprised of various golf balls that have been designed to provide optimal playing characteristics. These characteristics are generally the initial velocity and spin of the golf ball, which can be optimized for various players. For instance, certain players prefer to play a ball that has a high spin rate for playability. Other players prefer to play a ball that has a low spin rate to maximize distance. However, these balls tend to be hard feeling and difficult to control around the greens.

The prior art is comprised of liquid filled golf balls. Wound golf balls have been made with liquid centers for many years. Both U.S. Pat. Nos. 1,568,513 and 1,904,012 are directed to wound golf balls with liquid filled centers. U.S. Pat. Nos. 5,150,906 and 5,480,155, are directed to a hollow spherical shell of a polymeric material which is filled with a liquid or unitary, non-cellular material that is a liquid when introduced into the shell. The shell is disclosed as being the outer cover or an inner layer with the outer cover formed to the external surface thereof. The shell varies in thickness from about 0.060 to 0.410 inches in thickness.

SUMMARY OF THE INVENTION

Broadly, the present invention comprises a golf ball having a core and a cover in which the core is comprised of a fluid or liquid center surrounded by a mantle portion. The mantle portion is comprised of a first mantle layer surrounding the center and a second, solid, non-wound mantle layer that is comprised of a thermoset rubber or thermoplastic elastomeric material. The mantle portion of the core, preferably, has an inner diameter in a range of about 30 to 70% of the finished ball diameter and an outer diameter of about 80 to 98% of the finished ball diameter.

Still further, for a preferred golf ball having an outer diameter of approximately 1.68 inches, the first mantle layer preferably has an inner diameter of approximately 0.5 to 1.18 inches and, more preferably, approximately 0.75 to 1.1. Most preferably, the first mantle layer has an inner diameter of approximately 0.9 to 0.95 inches. The present invention is also preferably comprised of a second mantle layer having an inner diameter in the range of 0.55 to 1.45 inches and, more preferably, having an inner diameter of approximately 0.8 to 1.3 inches. Yet further still, the present invention has a second mantle layer having an outside diameter in the range of 1.3 to 1.65 inches and, more preferably, in the range of 1.45 to 1.62 inches. In the most preferred embodiment, the second mantle layer has a radial thickness of about 0.2 to 0.3 inches.

Still further, the invention is preferably a golf ball comprised of a fluid or liquid center; a first mantle layer comprised of either a thermoplastic elastomer, such as a rubber based material, or a plastic material, such as polypropylene; a second mantle layer comprised of a thermoset rubber material, such as polyisoprene, styrene butadiene or polybutadiene, or combinations thereof or thermoplastic elastomeric materials such as copolymers of methylmethacrylate with butadiene and styrene, copolymers of methyl-acrylate with butadiene and styrene, acrylonitrile styrene copolymers, polyether-ester, polyether-amide, polyurethane and/or blends thereof; and a cover.

More particularly, the invention is directed to a golf ball having a fluid or liquid filled center having a specific gravity and viscosity such that the performing properties of the ball, such as the moment of inertia, may be varied to achieve certain desired parameters such as spin rate, spin decay, compression, initial velocity, etc. Still further the fluid filled center preferably has a high specific gravity for a high spin ball or a low specific gravity for a low spin ball. Still more particularly, the invention is directed to a golf ball having a high viscosity fluid or liquid filled center for a low spin rate ball or a low viscosity for a high spin rate ball. By providing two mantle layers for surrounding the center, the properties thereof, such as specific gravity, resiliency and compression can be varied to make balls having the desired characteristics.

DESCRIPTION OF THE PREFERRED EMBODIMENT

Figure 1:
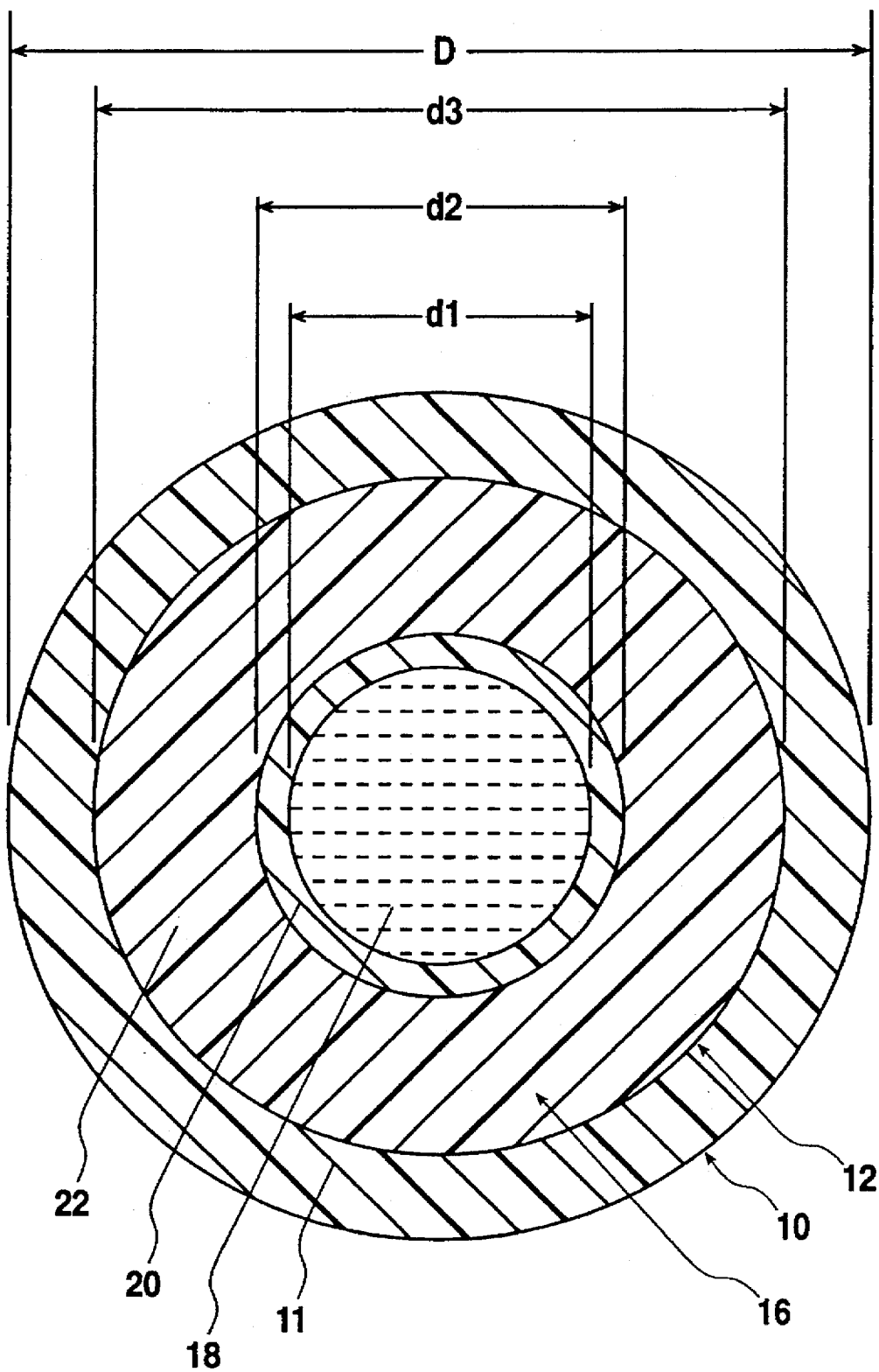
FIG. 1 is a sectional view of a ball of the present invention.

Referring to FIG. 1, ball 10 includes a cover 11 and a core 12. The core 12 in turn includes a fluid or liquid filled cavity or center 18 and a mantle portion 16, which is comprised of a first, inner portion 20 and a second, outer portion 22.

The cover 11 provides the interface between the ball 10 and a club and other objects such as trees, cart paths and grass. Properties that are desirable for the cover are good flowability, high abrasion resistance, high tear strength, high resilience, and good mold release, among others. The cover 11 can be comprised of polymeric materials such as ionic copolymers of ethylene and an unsaturated monocarboxylic acid which are available under the trademark "SURLYN" of E. I. DuPont De Nemours & Company of Wilmington, Del. or "IOTEK" or "ESCOR" from Exxon. These are copolymers of ethylene and methacrylic acid or acrylic acid partially neutralized with zinc, sodium, lithium, magnesium, potassium, calcium, manganese, nickel or the like.

In accordance with the various embodiments of the present invention, the cover 11 is of a thickness to generally provide sufficient strength, good performance characteristics and durability. Preferably, the cover 11 is of a thickness from about 0.03 inches to about 0.12 inches. More preferably, the cover 11 is about 0.04 to 0.09 inches in thickness and, most preferably, is about 0.05 to 0.085 inches in thickness.

In accordance with a preferred embodiment of this invention, the cover in question can be formed from mixtures or blends of zinc and/or lithium and sodium ionic copolymers.

Surlyn resins are ionic copolymers in which sodium, lithium or zinc salts are the reaction product of an olefin having from 2 to 8 carbon atoms and an unsaturated monocarboxylic acid having 3 to 8 carbon atoms. The carboxylic acid groups of the copolymer may be totally or partially neutralized and might include methacrylic, crotonic, maleic, fumaric or itaconic acid.

This invention can likewise be used in conjunction with homopolymeric and copolymer materials such as:

(1) Vinyl resins such as those formed by the polymerization of vinyl chloride, or by the copolymerization of vinyl chloride with vinyl acetate, acrylic esters or vinylidene chloride.

(2) Polyolefins such as polyethylene, polypropylene, polybutylene and copolymers such as polyethylene methylacrylate, polyethylene ethylacrylate, polyethylene vinyl acetate, polyethylene methacrylic or polyethylene acrylic acid of polypropylene acrylic acid and copolymers and single-site catalytic polymers containing olefinic monomers.

(3) Polyurethanes such as those prepared from polyols and diisocyanates or polyisocyanates.

(4) Polyamides such as poly(hexamethylene adipamide) and others prepared from diamines and dibasic acids, as well as those from amino acids such as poly(caprolactam), and blends of polyamides with Surlyn, polyethylene, ethylene copolymers, ethyl-propylene-non-conjugated diene terpolymer, etc.

(5) Acrylic resins and blends of these resins with poly vinyl chloride, elastomers, etc.

(6) Thermoplastic rubbers such as the urethanes, olefinic thermoplastic rubbers such as blends of polyolefins with ethyl-propylene-non-conjugated diene terpolymer, block copolymers of styrene and butadiene, or isoprene or ethylene-butylene rubber, polyether block amides, an example of such a product is sold under the trademark "Pebax" by Rilsan Industrial, Inc., Birdsboro, Pa. 19508.

(7) Polyphenylene oxide resins, or blends of polyphenylene oxide with high impact polystyrene as sold under the trademark "Noryl" by General Electric Company, Pittsfield, Mass.

(8) Thermoplastic polyesters, such as polyethylene terephthalate, polybutylene terephthalate, polyethylene terephthalate/glycol modified and elastomers sold under the trademarks "Hytrel" by E. I. DuPont De Nemours & Company of Wilmington, Del. and "Lomod" by General Electric Company, Pittsfield, Mass.

(9) Blends and alloys, including polycarbonate with acrylonitrile butadiene styrene, polybutylene terephthalate, polyethylene terephthalate, styrene maleic anhydride, polyethylene, elastomers, etc. and polyvinyl chloride with acrylonitrile butadiene styrene or ethylene vinyl acetate or other elastomers. Blends of thermoplastic rubbers with polyethylene, propylene, polyacetal, nylon, polyesters, cellulose esters, etc.

Preferably, the cover 11 is comprised of polymers such as ethylene, propylene, butene-1 or hexane-1 based homopolymers and copolymers including functional monomers such as acrylic and methacrylic acid and fully or partially neutralized ionomer resins and their blends, methyl acrylate, methyl methacrylate homopolymers and copolymers, imidized, amino group containing polymers, polycarbonate, reinforced polyamides, polyphenylene oxide, high impact polystyrene, polyether ketone, polysulfone, poly(phenylene sulfide), acrylonitrile-butadiene, acrylic-styrene-acrylonitrile, poly(ethylene terephthalate), poly(butylene terephthalate), poly(ethelyne vinyl alcohol), poly(tetrafluoroethylene) and their copolymers including functional comonomers and blends thereof. Still further, the cover 11 is preferably comprised of a polyether or polyester thermoplastic urethane, a thermoset polyurethane, a low modulus ionomer such as acid-containing ethylene copolymer ionomers, including E/X/Y copolymers where E is ethylene, X is an acrylate or methacrylate-based softening comonomer present in 0–50 weight percent and Y is acrylic or methacrylic acid present in 5–35 weight percent. More preferably, the acrylic or methacrylic acid is present in 15–35 weight percent, making the ionomer a high modulus ionomer.

The mantle portion 16 is made of at least a first layer 20 surrounding the liquid or fluid filled cavity or center 18 and a second mantle layer 22 surrounding the first mantle layer 20. The first mantle layer 20 is preferably made of a thermoset rubber such as polyisoprene, styrene butadiene, polybutadiene and combinations thereof; a plastic, such as polypropylene; or a thermoplastic elastomeric material such as copolymers of methyl-methacrylate with butadiene and styrene, copolymers of methyl-acrylate with butadiene and styrene, acrylonitrile styrene copolymers, polyether-ester, polyether-amide, polyurethane and/or blends thereof. In another embodiment, the first mantle layer 20 is made of a metallic material, and is preferably a light weight metal such as aluminum.

Figure 1A:
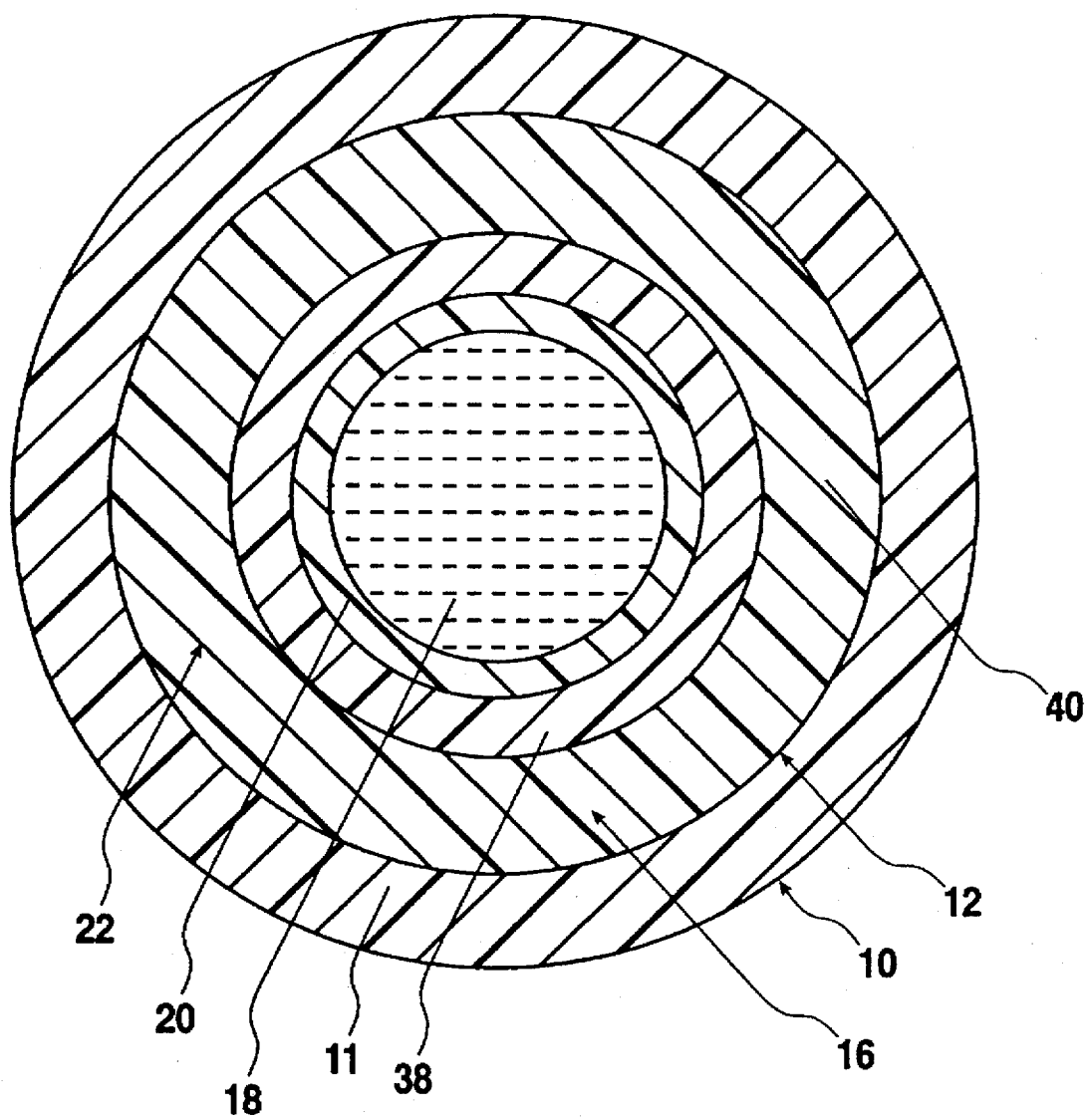
FIG. 1A is a sectional view of a ball of the present invention with a second mantle layer having two layers.

The mantle portion 16 also comprises the second layer 22 surrounding the first mantle layer 20. The second mantle layer 22 is shown as a single layer, but can be one or more layers made from one or more materials. FIG. 1A shows the second mantle layer 22 having two layers 38 and 40. The second layer 22 is preferably made of thermoset rubber such as polyisoprene, styrene butadiene, polybutadiene and combinations thereof or thermoplastic elastomeric materials such as copolymers of methyl-methacrylate with butadiene and styrene, copolymers of methyl-acrylate with butadiene and styrene, acrylonitrile styrene copolymers, polyether-ester, polyether-amide, polyurethane and/or blends thereof.

The mantle portion 16 preferably has an outside diameter d3 in the range of 80 to 98% of the finished ball diameter D and an inner diameter d1 in the range of 30 to 70% of the finished ball diameter. Preferably, mantle portion 16 and the first mantle layer 20 have an inner diameter of approximately 0.5 to 1.18 inches and, more preferably, an inner diameter of approximately 0.75 to 1.1 inches. Preferably, the mantle portion 16 and first mantle layer 20 have an inner diameter of approximately 0.9 to 0.95 inches. The second mantle layer 22 preferably has an inner diameter d2 in the range of 0.55 to 1.45 inches and, more preferably, approximately 0.8 to 1.3 inches. Yet further still, the mantle portion 16 and the second mantle layer 22 have an outside diameter in the range of 1.3 to 1.65 inches and, more preferably, approximately 1.45 to 1.62 inches. A golf ball incorporating these measurements can be designed with the various attributes discussed below, such as specific gravity, resiliency and hardness, to provide the desired playing characteristics, such as spin rate and initial velocity. More particularly, by using a first mantle layer to surround the fluid or liquid center and at least a second mantle layer, the specific gravities and other properties can be tailored to provide optimum playing characteristics. More particularly, by constructing a ball according to these dimensions, the second mantle layer is made with a significant volume compared to the fluid center. Preferably, the volume of the second mantle layer is greater than the volume of the fluid center. More preferably, the volume of the second layer is about 2 to 4 times the volume of the fluid center. Thus, the properties of the second mantle layer can effect the playing characteristics of the ball.

The hardness and resiliency of the mantle portion 16 can be varied to achieve certain desired parameters such as spin rate, compression and initial velocity.

Preferably, the mantle portion 16 has a hardness of approximately 30 to 95 Shore C, and more preferably, 45 to 90 Shore C. Still further, the mantle portion 16 has a resiliency greater than 40 bashore.

In a most preferred embodiment, the first mantle layer 20 is comprised of a plastic material having high temperature resistance. The second mantle layer 22 is comprised of a polybutadiene material that has high specific gravity for a low spin rate ball and a low specific gravity for a high spin rate ball. It is known that the specific gravity of the polybutadiene material can be varied by adding fillers known to those skilled in the art.

The fluid cavity or center 18 can be filled with a wide variety of materials including air, water solutions, gels, foams, hot-melts, other fluid materials and combinations thereof. The fluid or liquid in the center 18 can be varied to modify the performance parameters of the ball, such as the moment of inertia. Preferably, the fluid or liquid in the cavity 18 is comprised of a material that has a high specific gravity for high spin rate golf balls and a material that has a low specific gravity for a low spin rate golf ball. Preferably, the specific gravity of the fluid or liquid is below or equal to 1.2 for low specific gravity centers and above 1.2 for high specific gravity centers. More preferably, the specific gravity is approximately 1.15–1.2 for low specific gravity centers and approximately 1.3–1.55 for high specific gravity centers. Still further, the fluid is preferably comprised of a material with a low viscosity for a golf ball having a high spin rate and a material having a high viscosity for a golf ball having a low spin rate. Preferably, the viscosity of the fluid or liquid center is less than 100 cps for low viscosity centers and greater than or equal to 100 cps for high viscosity centers. More preferably, the viscosity of the fluid or liquid center is less than or equal to 10 cps for low viscosity centers and is between 100 and 1500 cps for high viscosity centers. Most preferably, the fluid or liquid center viscosity is approximately 500 cps for high viscosity centers.

Examples of suitable liquids include either solutions such as salt in water, corn syrup, salt in water and corn syrup, glycol and water or oils. The liquid can further include pastes, colloidal suspensions, such as clay, barytes, carbon black in water or other liquid, or salt in water/glycol mixtures. Examples of suitable gels include water gelatin gels, hydrogels, water/methyl cellulose gels and gels comprised of copolymer rubber based materials such a styrene-butadiene-styrene rubber and paraffinic and/or naphthenic oil. Examples of suitable melts include waxes and hot melts. Hot-melts are materials which at or about normal room temperatures are solid but at elevated temperatures become liquid. A high melting temperature is desirable since the liquid core is heated to high temperatures during the molding of the second mantle layer and the cover.

The liquid in the cavity 18 can be a reactive liquid system which combine to form a solid. Examples of suitable reactive liquids are silicate gels, agar gels, peroxide cured polyester resins, two part epoxy resin systems and peroxide cured liquid polybutadiene rubber compositions. It is understood by one skilled in the art that other reactive liquid systems can likewise be utilized depending on the physical properties of the mantle layer and the physical properties desired in the resulting finished golf balls.

The core 12 is preferably 60 to 95% of the total ball weight and more preferably, 75 to 86% of the ball weight. As stated above, the weight distribution within the core 12 can be varied to achieve certain desired parameters such as spin rate, compression and initial velocity.

For example, by increasing the diameter of the fluid or liquid filled center cavity 18, and increasing the specific gravity of the mantle portion 16, the weight distribution of the core is moved toward the outer diameter for a lower spin rate ball. In contrast, the diameter of the fluid or liquid filled center 18 can be decreased and the specific gravity of the mantle layer 16 decreased to move the weight distribution of the ball towards the ball center for a high spin rate ball.

Similarly, the specific gravity of the fluid or liquid filled center can be decreased and the specific gravity of the mantle portion 16 increased for a low spin rate ball. Alternatively, the specific gravity of the fluid or liquid filled center 18 can be increased and the specific gravity of the mantle portion 16 decrease for a high spin rate ball.

Various examples of golf ball cores according to the invention are set forth below.

EXAMPLE 1

A core according to the present invention was created having a liquid center, a first mantle layer surrounding the liquid and a second mantle layer surrounding the first mantle layer.

The liquid was a salt, water and corn syrup solution comprised of 40% salt, 30% water and 30% corn syrup. The liquid center had an outside diameter of approximately 0.965 inches.

The first mantle layer was created from a thermoplastic elastomer. The first mantle layer had an outside diameter of approximately 1.125 inches.

The second mantle layer was created from crosslinked polybutadiene. The second mantle layer had an outside diameter of approximately 1.51 inches.

The core weighed 38.9 g and had a PGA compression of less than 60.

EXAMPLE 2

A core according to the present invention was created having a liquid center, a first mantle layer surrounding the liquid and a second mantle layer surrounding the first mantle layer.

The liquid was a salt, water and corn syrup solution comprised of 40% salt, 30% water and 30% corn syrup. The liquid filled center had an outside diameter of approximately 0.938 inches.

The first mantle layer was created from polypropylene. The first mantle layer had an outside diameter of approximately 1.0625 inches.

The second mantle layer was created from crosslinked polybutadiene. The second mantle layer had an outside diameter of approximately 1.51 inches.

The core weighted 33.4 g and had a PGA compression of approximately 60.

EXAMPLE 3

A core according to the present invention was created having a fluid center, a first mantle layer surrounding the fluid and a second mantle layer surrounding the first mantle layer.

The fluid was air. The fluid center had an outside diameter of approximately 0.938 inches.

The first mantle layer was created from polypropylene. The first mantle layer had an outside diameter of approximately 1.0625 inches.

The second mantle layer was created from crosslinked polybutadiene. The second mantle layer had an outside diameter of approximately 1.51 inches.

The core weighted 26 g and had a PGA compression of approximately 87.

Figure 2:
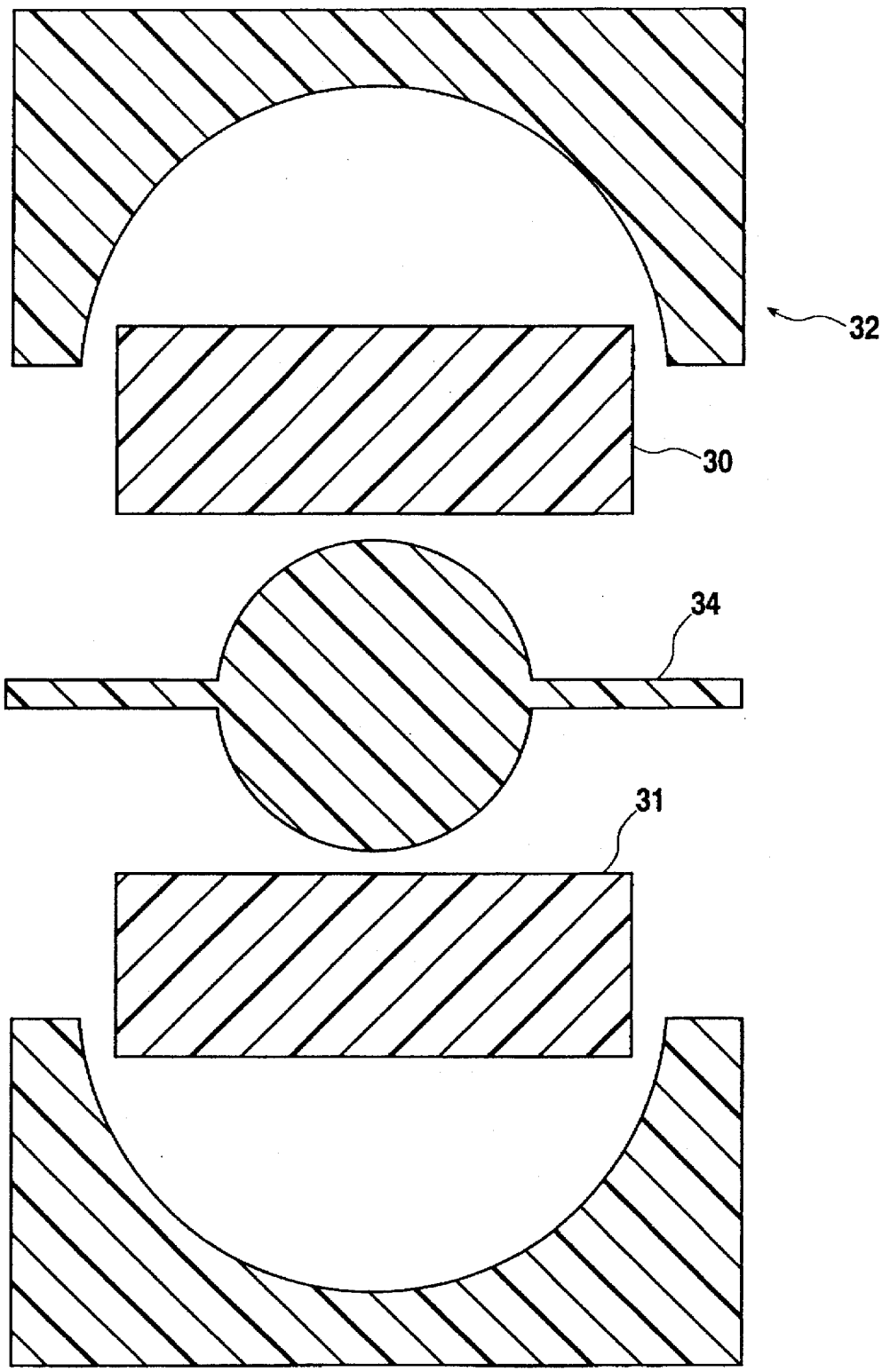
FIG. 2 is a sectional view of a mold preforming a mantle layer according to the present invention.
Figure 3:
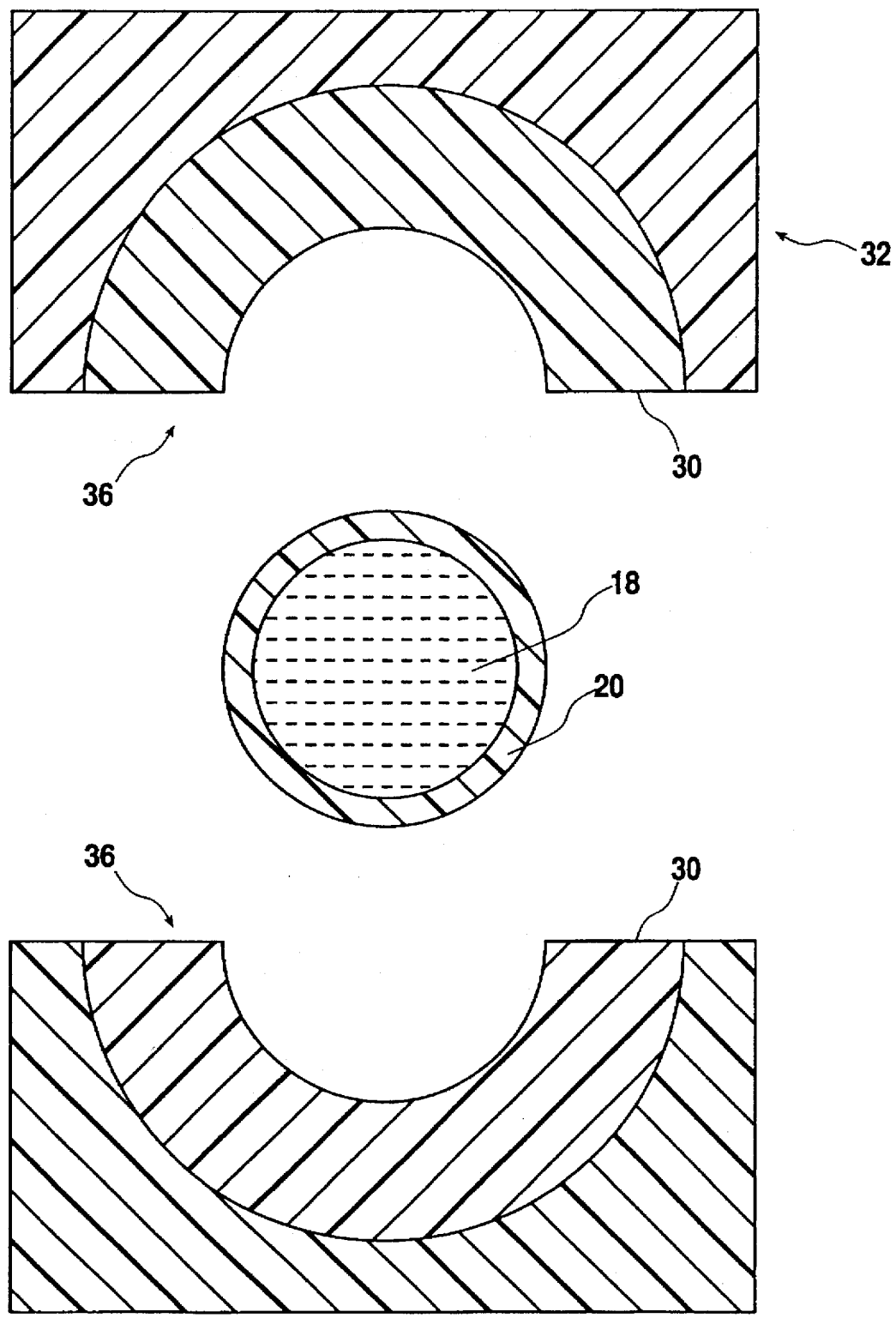
FIG. 3 is a sectional view of the mold forming a golf ball core according to the present invention.

Turning to FIGS. 2 and 3, a golf ball of the present invention can be formed by initially forming the first mantle layer 20 to create cavity or center 18 and filling the cavity 18 with fluid or liquid. The second mantle layer is formed by pre-forming top and bottom cups 30 and 31 of polybutadiene in a compression mold 32 with an inner fixture 34 as shown in FIG. 2. The mold 32 is then opened and the inner fixture 34 is removed, leaving a preform 36 in the top and bottom cups 30 and 31 of the second mantle layer. The first mantle layer 20 and fluid or liquid center 18 are then inserted into the bottom cup 31 and the mold 32 is closed and run through a normal temperature and pressure cycle to crosslink the second mantle layer 22 to form the core 12. The cover 11 is then compression molded or injection molded over the core 12, which processes are well known in the art.

While it is apparent that the illustrative embodiments of the invention herein disclosed fulfills the objectives stated above, it will be appreciated that numerous modifications and other embodiments may be devised by those skilled in the art. Therefore, it will be understood that the appended claims are intended to cover all such modifications and embodiments which come within the spirit and scope of the present invention.

We claim:

1. A golf ball having a diameter and being comprised of a core and a cover, wherein the core is further comprised of a fluid mass at the center of the ball, a first mantle layer surrounding the fluid mass and a second, solid, non-wound mantle layer surrounding and abutting the first mantle layer, wherein the first mantle layer has an inner diameter of 30 to 70% of the ball diameter and is a polymer material selected from the group of thermoset rubber, plastic, and thermoplastic elastomeric material and the second mantle layer has an outer diameter of 80 to 98% of the ball diameter and the second mantle layer is a polymer material selected from the group of thermoset rubber materials and thermoplastic elastomeric materials.

2. The golf ball of claim 1 wherein the golf ball diameter is at least 1.68 inches.

3. The golf ball of claim 1 wherein the cover is comprised of a polymer selected from the group of ethylene, propylene, butene-1 and hexane-1 based monomers.

4. The golf ball of claim 1, wherein the cover is comprised of a material selected from the group of polyether and polyester thermoplastic urethane, thermoset polyurethane, ionomer resins, low modulus ionomers, high modulus ionomers and blends thereof.

5. The golf ball of claim 1 wherein the golf ball diameter is approximately 1.68 inches and the first mantle layer has an inner diameter of approximately 0.5 to 1.18 inches.

6. The golf ball of claim 1 wherein the golf ball diameter is approximately 1.68 inches and the first mantle layer has an inner diameter of approximately 0.75 to 1.1 inches.

7. The golf ball of claim 1 wherein the golf ball diameter is approximately 1.68 inches the first mantle layer has an inner diameter of approximately 0.9 to 0.95 inches.

8. The golf ball of claim 1 wherein the golf ball diameter is approximately 1.68 inches and the second mantle layer has an inner diameter of approximately 0.55 to 1.45 inches.

9. The golf ball of claim 1 wherein the golf ball diameter is approximately 1.68 inches and the second mantle layer has an inner diameter of approximately 0.8 to 1.3 inches.

10. The golf ball of claim 1 wherein the golf ball diameter is approximately 1.68 inches and the second mantle layer has an outer diameter of approximately 1.3 to 1.65 inches.

11. The golf ball of claim 1 wherein the golf ball diameter is approximately 1.68 inches and the second mantle layer has an outer diameter of approximately 1.45 to 1.62 inches.

12. The golf ball of claim 1 wherein the second mantle layer is comprised of more than one layer.

13. The golf ball of claim 1 wherein the fluid has a specific gravity of greater than 1.2 and a viscosity of less than or equal to 100 cps.

14. The golf ball of claim 1 wherein the fluid has a specific gravity of approximately 1.3 to 1.55 and a viscosity of less than or equal to 10 cps.

15. The golf ball of claim 1 wherein the fluid has a specific gravity of less than or equal to 1.2 and a viscosity greater than 100 cps.

16. The golf ball of claim 1 wherein the fluid has a specific gravity of approximately 1.15 to 1.2 and a viscosity of approximately 100 to 1500 cps.

17. The golf ball of claim 16 wherein the fluid has a viscosity of approximately 500 cps.

18. A golf ball having a diameter of approximately 1.68 to 1.90 inches and comprising:

a fluid mass at the center of the ball;

a first, solid, non-wound mantle layer surrounding the fluid mass comprised of a polymer material selected from the group of thermoset rubber material, thermoplastic elastomeric material and plastic and having an inner diameter in the range of 30 to 70% of the ball diameter;

a second, solid, non-wound mantle layer surrounding and abutting the first mantle layer and being a polymer material selected from the group of thermoset rubber material and thermoplastic elastomeric material and having an outer diameter in the range of 80 to 98% of the ball diameter, a hardness of approximately 30 to 95 Shore C and a resiliency greater than 40 bashore; and a cover surrounding the second mantle layer.

19. The golf ball of claim 18 wherein the cover is comprised of a material selected from the group of ethylene, propylene, butene-1 and hexane-1 based homopolymers and copolymers.

20. The golf ball of claim 18, wherein the cover is comprised of a material selected from the group of polyether and polyester thermoplastic urethane, thermoset polyurethane, ionomer resins, low modulus ionomers, high modulus ionomers and blends thereof.

* * * * *